United States Patent [19]
Hery et al.

[11] Patent Number: 4,749,313
[45] Date of Patent: Jun. 7, 1988

[54] TRANSFER LINE FOR A SUSPENSION OF PARTICLES WITH A CONSTANT QUANTITY WITH A VIEW TO THE CONDITIONING THEREOF

[75] Inventors: Yves Hery, Orange; Jean-Pierre Moncouyoux, Bagnols sur Ceze; Lucien Mari, Orange, all of France

[73] Assignee: Commissariat a l'Energie Atomique, Paris, France

[21] Appl. No.: 908,186

[22] Filed: Sep. 17, 1986

[30] Foreign Application Priority Data

Sep. 18, 1985 [FR] France .................. 85 13824

[51] Int. Cl.⁴ .................................. B65G 53/48
[52] U.S. Cl. .................. 406/62; 73/863.41; 73/864.32; 406/134; 406/137
[58] Field of Search ............ 406/135, 142, 93, 155, 406/156, 52, 62, 136, 137, 134, 157; 198/509, 550.11, 701, 702; 73/864.32, 863.56, 863.41; 222/367, 356

[56] References Cited

U.S. PATENT DOCUMENTS

| | | | |
|---|---|---|---|
| 1,284,700 | 11/1918 | Johnson | 222/367 X |
| 1,348,885 | 8/1920 | Laffoon | 406/155 X |
| 2,193,145 | 3/1940 | Schurz | 406/157 |
| 4,203,689 | 5/1980 | Kraxner et al. | 406/138 X |

FOREIGN PATENT DOCUMENTS

| | | | |
|---|---|---|---|
| 2853086 | 6/1980 | Fed. Rep. of Germany. | |
| 1458527 | 12/1976 | United Kingdom | 406/142 |
| 2027131 | 2/1980 | United Kingdom. | |
| 1212439 | 2/1986 | U.S.S.R. | 406/142 |

Primary Examiner—Joseph F. Peters, Jr.
Assistant Examiner—James M. Kannofsky
Attorney, Agent, or Firm—Pearne, Gordon, McCoy & Granger

[57] ABSTRACT

The invention relates to a transfer line for a suspension of particles in constant quantity with a view to the conditioning thereof. This transfer line comprises a vessel, a separating tank, a hydraulic guard, sampling or removal structure comprising a sampling or removal tank and a dosing bucket wheel, as well as structure for preventing particles from being deposited from the particle suspension. The latter comprise distributing blades connected to a diffuser cone in a cup-shaped bottom of the hydraulic guard, a supplementary pipe for blowing in air at the direct arrival point of the suspension in said bottom, a removal tank making it possible for the suspension to arrive tangentially at the bottom of said tank and the removal of the suspension when it arrives in said tank by a dosing bucket wheel, each bucket being constituted by a tube having a continuous curvature. Application to the dosed transfer of all particle suspensions and in particular a suspension of particle fines with high specific masses.

5 Claims, 4 Drawing Sheets

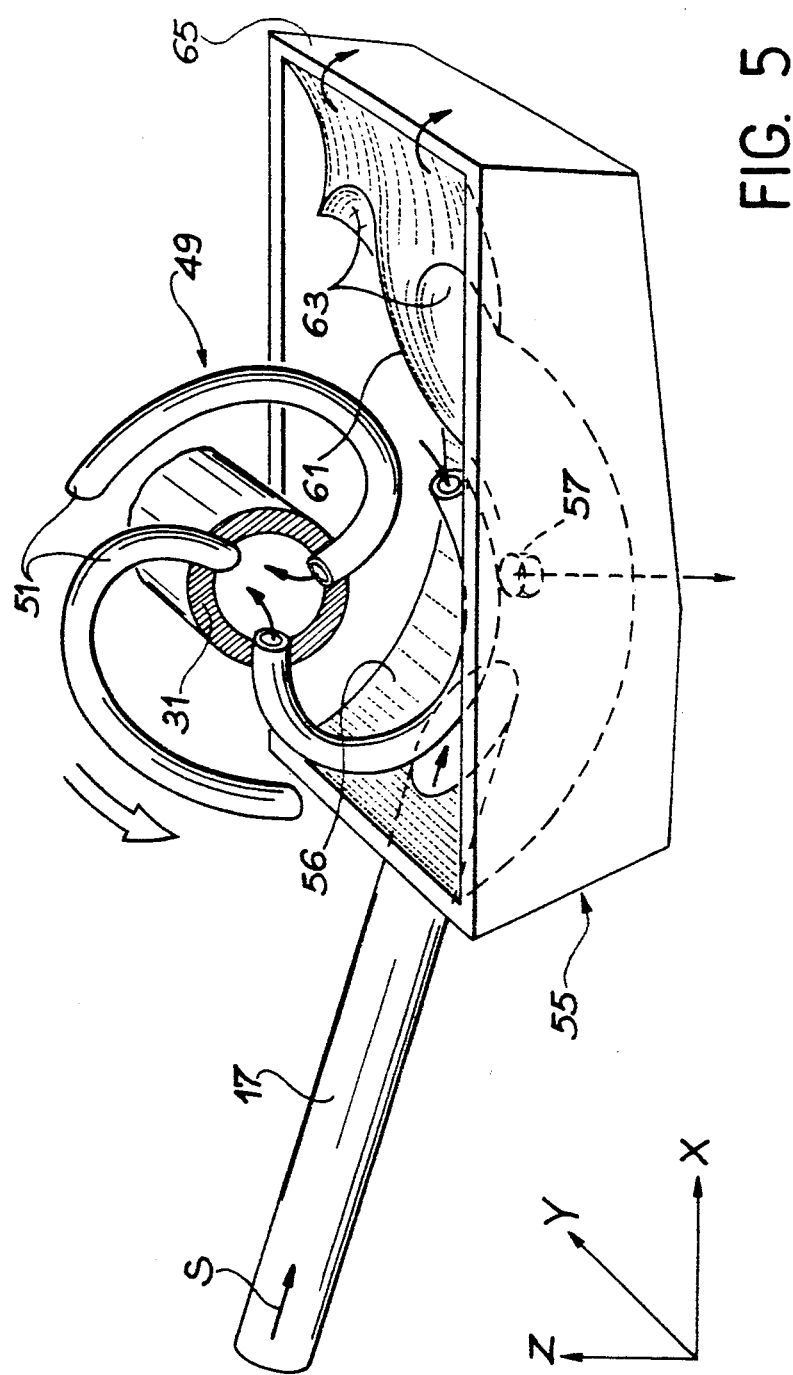

TRANSFER LINE FOR A SUSPENSION OF PARTICLES WITH A CONSTANT QUANTITY WITH A VIEW TO THE CONDITIONING THEREOF

BACKGROUND OF THE INVENTION

The present invention relates to a transfer line or chain for a suspension of particles in constant quantity with a view to the conditioning thereof. The invention applies to the dosed transfer of all suspensions of particles and more particularly a suspension of particles with high specific masses.

The invention e.g. applies to the field of nuclear reprocessing, in connection with the transfer of suspensions of dissolving and shearing fines. The dissolving and shearing fines respectively correspond to the chemical elements of nuclear fuel and to the chemical elements of the material enveloping said fuel, which are insoluble in the solutions used for dissolving the fuel and its envelope during nuclear reprocessing. A solution used for this type of dissolving is e.g. nitric acid.

The dissolving and shearing fines constitute a highly radioactive waste material requiring conditioning. Thus, they have to be incorporated in constant quantities into a matrix, so as to provide good confinement guarantees. For these reasons, the suspended dissolving and shearing fines are transferred in constant quantities to appropriate conditioning means by a transfer line.

The invention also applies to the field of treating effluents, particularly for the transfer and sampling of saturated ion exchange resins, as well as to the chemical industry in connection with the dosing of e.g. solid additives.

FIG. 1 diagrammatically shows a known transfer line or chain making it possible to transfer a suspension of particles and in particular a suspension of dissolving and shearing fines in a constant quantity.

This transfer chain comprises a vessel 1, provided with stirring means such as a stirrer 3, a separating tank 5 located above vessel 1 and connected to means for forming a vacuum, such as a vacuum pump 6, a hydraulic guard 11 below the separating tank 5 and sampling means 15 between guard 11 and vessel 1.

The term lower part of an element constituting the transfer line means the lowest part of said element as opposed to the upper part which constitutes the highest part thereof.

A pipe 7 connects vessel 1 to separating tank 5. The upper end of pipe 7 penetrates the separating tank 5 by the lower part of the latter. An inclined plane 23 within the separating tank 5 is located just above the upper end of pipe 7. The gradient of inclined plane 23 decreases towards the centre of separating tank 5.

Pipe 7 is also connected to a duct 22 for blowing in air.

Pipe 7 connected to duct 22 and separating tank 5 connected to means for forming the vacuum constitute an air-lift system.

A pipe 13 connects the lower end of separating tank 5 to hydraulic guard 11, which is a generally cylindrical reservoir. The lower end of pipe 13 is immersed in hydraulic guard 11. A pipe 17 connects the outlet of said hydraulic guard 11 to sampling or removal means 15. A pipe 18 connected to the latter makes it possible to discharge the suspension removed by means 15 to conditioning devices. The unremoved suspension is discharged by a pipe 19 connecting the lower end of the removal means 15 to vessel 1.

The remainder of the description deals with the operation of the transfer line shown in FIG. 1. The suspension displacement direction is indicated by a solid line arrow S.

The suspension of particles is introduced into vessel 1, where it is homogenized by stirrer 3. This homogenized suspension rises by duct 7 up to the separating tank 5 connected to a vacuum pump 6. For this purpose, air is blown in at 21 into the lower part of pipe 7 by duct 22 which is connected thereto. The blowing in of air at 21 and the vacuum pump 6 make it possible to raise the suspension of particles into said pipe 7.

When the suspension of particles having air bubbles reaches the separating tank 5, the latter is projected against inclined plane 23 and drops towards the bottom of separating tank 5. Moreover, the air is evacuated to means for forming the vacuum, such as the vacuum pump 6 positioned above separating tank 5, which therefore makes it possible to separate the suspension from the air.

The air-free particle suspension is then discharged to the hydraulic guard 11 by pipe 13 connected to the lower end of the separating tank 5. The particle suspension arrives directly in the bottom of hydraulic guard 11 by said pipe 13 and is discharged by the upper end of guard 11 connected to pipe 17. This hydraulic guard, which has a constant suspension level makes it possible to prevent any sucking in of e.g. air or suspension particularly by pipes 17, 18, 19 positioned downstream of the hydraulic guard, whilst it also ensures that the suspension rises through pipe 7 under good conditions.

The particle suspension is transferred from hydraulic guard 11 to the removal means 15 by pipe 17. This removal means 15 makes it possible to remove a constant suspension quantity which is discharged by pipe 18 to appropriate conditioning devices. The unremoved suspension is returned to vessel 1 through pipe 19.

The particle suspension flow in the transfer line is ensured by the blowing in of air at 21 into duct 22 connected to the lower end of pipe 7 and by the vacuum pump 6 connected to separating tank 5.

FIG. 2 describes in greater detail the sampling or removal means 15 of a known transfer line or chain. This removal means 15 comprises a reservoir 25 within which is located a removal or sampling tank 27 and a wheel 29 with dosing buckets 33. Wheel 29 and dosing buckets 33 are indicated by dot-dash lines. The suspension displacement direction is indicated by the solid line arrow S.

Reservoir 25 is funnel-shaped and is connected by its lower end to pipe 19 discharging the particle suspension to vessel 1.

Removal or sampling tank 27 is also funnel-shaped and is provided at its lower end with a discharge orifice 28. Pipe 17 for supplying the particle suspension to the removal means 15 is laterally connected to the removal or sampling tank 27.

Wheel 29 comprises several inwardly turned dosing buckets 33 connected symmetrically with respect to a collector 31. This collector discharges the sampled suspension into the upper end of pipe 18. These dosing buckets are generally distributed in different planes. They are formed from generally metallic tubes. The shape of each bucket 33 is obtained by welding together several tubes, so that a non-continuous curvature is obtained. Wheel 29, preferably with a horizontal rotation axis, is a dosing bucket wheel, which is rotated by a not shown electric motor. Wheel 29 is partly located in removal or sampling tank 27 so that, during rotation, it removes a constant particle suspension quantity. The suspension level in tank 27 is kept constant by a permanent overflow of the suspension therefrom. Moreover, the orifice 28 made at the bottom of tank 27 permits the discharge of settled particles to the pipe 19 connected to reservoir 25. The suspension removed is discharged by collector 31 and then pipe 18 to appropriate conditioning devices.

In a known particle suspension transfer line, the particles with a high specific mass are deposited and form sediments in the different parts of said chain and particularly in the bottom of the hydraulic guard, in the removal or sampling tank and in the vicinity of welds on the dosing buckets. These deposits do not make it possible to remove suspension quantities representative of the initial particle concentration at the start of the transfer line. In the long run, they can also lead to the blocking of discharges from the transfer line and particularly from the removal or sampling tank.

These deposits increase with the mass, grain size and density of the suspended particles. This is the case with dissolving fines consisting of the following chemical elements: molybdenum, technetium, ruthenium, rhodium, palladium, uranium and plutonium, as well as shearing fines consisting of zircalloy or stainless steel. Thus, the chemical elements of the dissolving fines have a specific mass between 6 and 20 specific mass units and a grain size up to 1.5 $\mu$m. The chemical elements of the shearing fines have a specific mass between 6 and 20 specific mass units and a grain size up to 100 $\mu$m. Moreover, as the dissolving the shearing fines are radioactive, any residue of these fines in the transfer line constitutes a considerable disadvantage.

SUMMARY OF THE INVENTION

The invention aims at obviating these disadvantages and more particularly at preventing any deposition of particles from a particle suspension in the hydraulic quard and in the sampling or removal means, more particularly by bringing about a permanent turbulence of the suspension.

More specifically, the present invention relates to a transfer line for a suspension of particles in a constant quantity for the conditioning thereof and comprising a vessel for receiving the particle suspension, means for stirring said suspension in the vessel and for making it homogeneous, a separating tank above the vessel, connected to the upper end by a first pipe and means for forming a vacuum, the first pipe making it possible to raise the suspension of particles from the vessel to the separating tank by blowing in air, said tank making it possible to separate the blown in air and the particle suspension, a hydraulic guard below the separating tank connected thereto by a second pipe and removal means below the hydraulic guard connected thereto by a third pipe, said removal means comprising a sampling tank and a dosing bucket wheel rotating in said tank, said removal means making it possible to remove a constant particle suspension quantity with a view to the conditioning thereof and a fourth pipe connected to the removal means ensuring the discharge of the unremoved particle suspension into the vessel, wherein the hydraulic guard and/or removal means incorporate means for preventing the deposition of particles from the particle suspension.

According to an embodiment of the transfer line for a suspension of particles in constant quantity, the means for preventing particle deposits comprise distributing blades connected to a diffuser cone located in a cup-shaped bottom of the hydraulic guard and to the lower end of the second pipe.

Advantageously, the means for preventing particle deposits from the particle suspension comprise a supplementary pipe permitting the blowing in of air at the point where the particle suspension enters the hydraulic guard at the lower end of the second pipe.

According to another embodiment of a transfer line for a particle suspension in constant quantity, the means for preventing particle deposits comprise a sampling or removal tank having a flat bottom adjacent to the funnel-shaped bottom provided with a discharge orifice, said flat bottom sloping with respect to a horizontal plane, so that the slope of said bottom decreases towards the funnel-shaped bottom, the lower end of the third pipe being tangentially connected to the flat bottom, the dosing bucket wheel being tangential to said flat bottom.

According to another constructional variant, the means for preventing particle deposits comprise a removal tank having a concave bottom with a convex portion, the lower end of the third pipe being connected tangentially to the concave bottom, the convex portion being opposite to the end of said third pipe, so that the dosing bucket wheel is tangential to the concave bottom and to the convex portion, a discharge orifice being provided in the concave bottom at the start of the convex portion and in the vertical axis of said wheel.

According to another embodiment of a transfer line for a particle suspension in constant quantity, the means for preventing particle deposits comprise a dosing bucket wheel, whereof each bucket is constituted by a single tube having a continuous curvature, said buckets being symmetrically distributed with respect to a collector in the centre of the wheel and being located in the same plane or in parallel planes, said collector permitting the discharge of the particle suspension with a view to the conditioning thereof.

BRIEF DESCRIPTION OF THE DRAWINGS

The invention is described in greater detail hereinafter relative to non-limitative embodiments and the attached drawings, wherein show:

FIG. 5 diagrammatically another embodiment according to the invention of a transfer line removal tank.

DETAILED DESCRIPTION OF THE PREFERRED EMBODIMENTS

Figure 3:
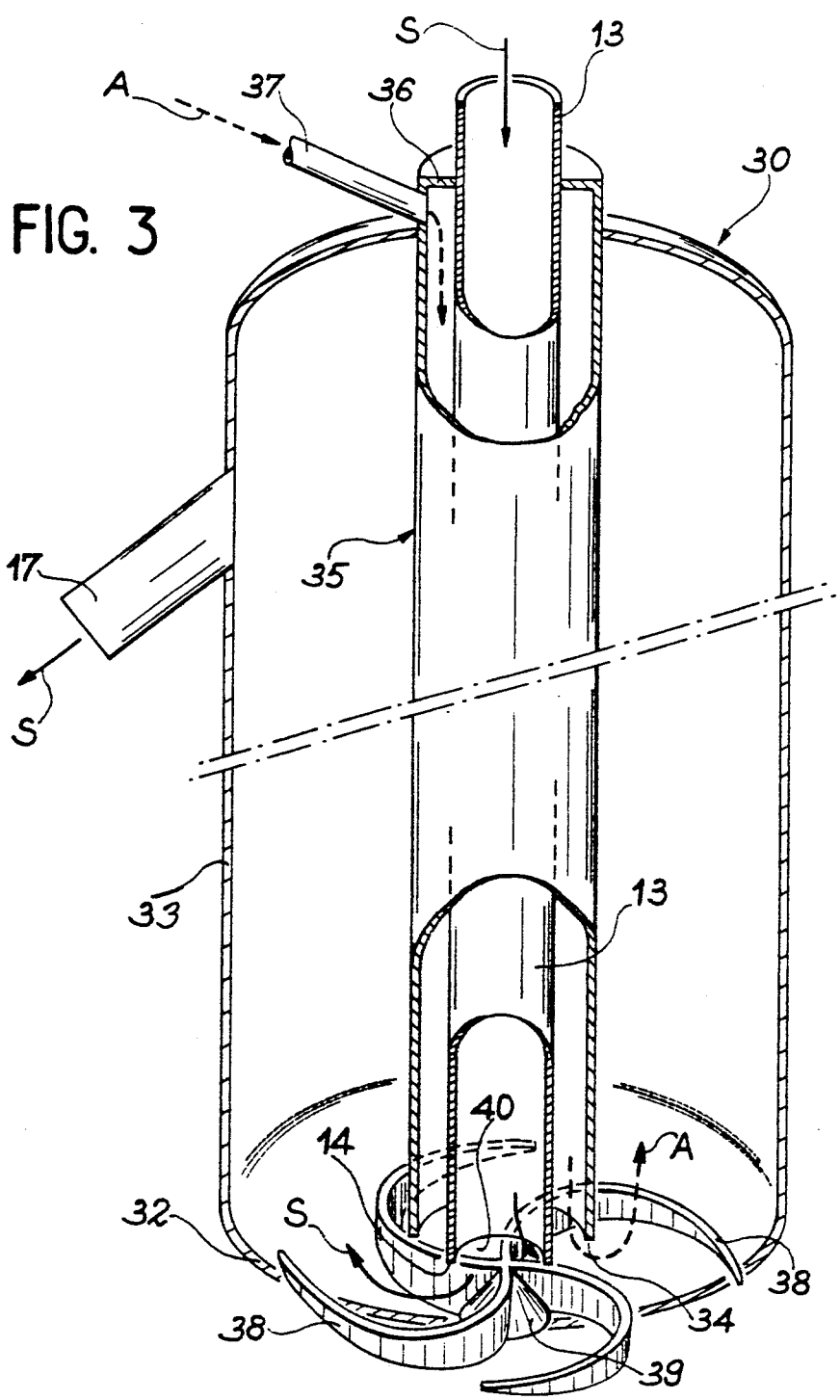
FIG. 3 diagrammatically an embodiment according to the invention of a transfer line hydraulic guard.

FIG. 3 diagrammatically shows an embodiment of a hydraulic guard according to the invention comprising means for preventing deposits of particles of a particle suspension in the bottom of the hydraulic guard.

Hydraulic guard 30 is a generally cylindrical reservoir, whose bottom 32 is a cup-shaped. The hydraulic guard 30 is penetrated by a pipe 13 connecting a separating tank 5, of the type described relative to FIG. 1, to the hydraulic guard. Pipe 13 makes it possible to bring the particle suspenion directly to the bottom 32 of the hydraulic guard 30.

On the bottom 32 of hydraulic guard 30 are provided distributing blades 38 connected to a disffuser cone 39. These distributing blades are symmetrically ditributed with respect to cone 39 and, as shown in the drawing, there are generally four of them. Each blade is formed from a generally metallic, curved strip. The height of a blade decreases from the diffuser cone up to the cylindrical wall 33 of the hydraulic guard 30. The suspension supply pipe 13 is centered on the diffuser cone 39 and rests on its distributing blades 38. An ejection orifice 40 is formed between two blades by the lower end 14 of said pipe 13.

A supplementary pipe 35 is located within the hydraulic guard 30 and surrounds pipe 13, so as to form an annular space between the cylindrical walls of pipe 13 and pipe 35. The upper end 36 of pipe 35, generally outside hydraulic guard 30 is closed. Pipe 35 is connected outside the hydraulic guard to a pipe 37 into which the air is blown. The lower end 34 of pipe 35 is open, the lower end 14 of pipe 13 being lower than the lower end 34 of pipe 35, so that said lower end 34 does not rest on the distributing blades 38.

Thus, when the particle suspension, whose displacement direction is represented by the solid line arrow S, enters the bottom 32 of hydraulic guard 30 by pipe 13, it is discharged by ejection orifices 40. It then slides on diffuser cone 39 towards bottom 32 and adapts to the shape of the distributing blades 38. The curved shape of these blades gives the suspension a whirling movement.

Diffuser cone 39 and blades 38 thus make it possible to bring about a permanent turbulence in the lower portion of hydraulic guard 30.

Air, whose displacement direction is indicated by the dotted line arrow A is blown into pipe 37 connected to pipe 35. When the air reaches the lower end 34 of pipe 35, said air acts directly at the outlet of the suspension from pipe 13. This blowing in of air makes it possible to complete the effectiveness of the diffuser cone 39 and distributing blades 38 by increasing the intensity of the turbulence.

The air-charged particle suspension is then discharged by pipe 17 laterally connecting the upper end of hydraulic guard 30 to sampling or removal means 15. The level of the suspension in the hydraulic guard is constant.

The blowing in of air mixing the suspension, as well as the diffuser cone and distributing blades ensure an adequate turbulence to prevent particle deposits, thus making it possible to retain the homogeneity and representativeness of the suspension entering and leaving the hydraulic guard.

With such a hydraulic guard 30, particles particularly of steel and having a size equal to or below 100 μm and suspended in water with contents between 5 and 50 g/l can circulate in said guard with flow rates of approximately 300 l/h without any sedimentation occurring.

Figure 4:
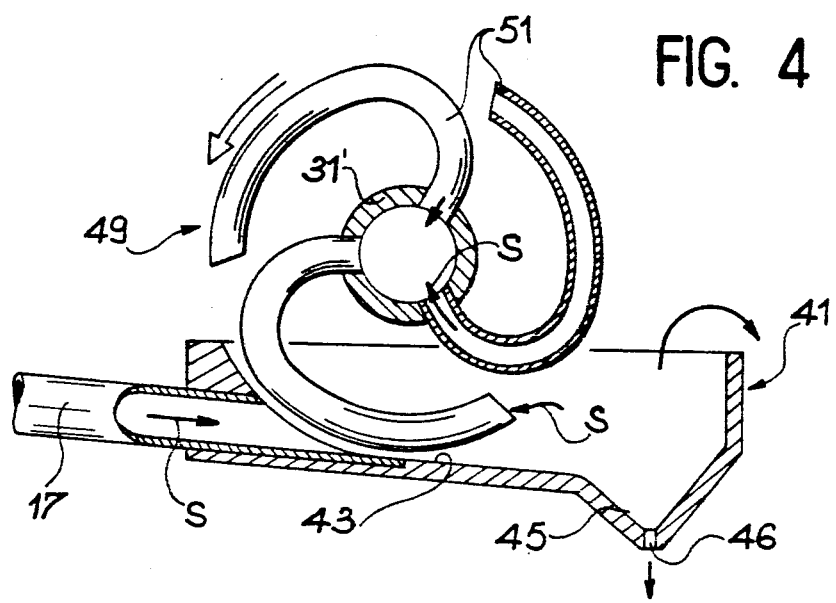
FIG. 4 diagrammatically an embodiment according to the invention of a removal tank and a dosing bucket wheel of a transfer line.

FIG. 4 diagrammatically shows an embodiment of a removal or sampling tank and a dosing bucket wheel of the removal means according to the invention, making it possible to prevent deposits of particles from a particle suspension.

Figure 2:
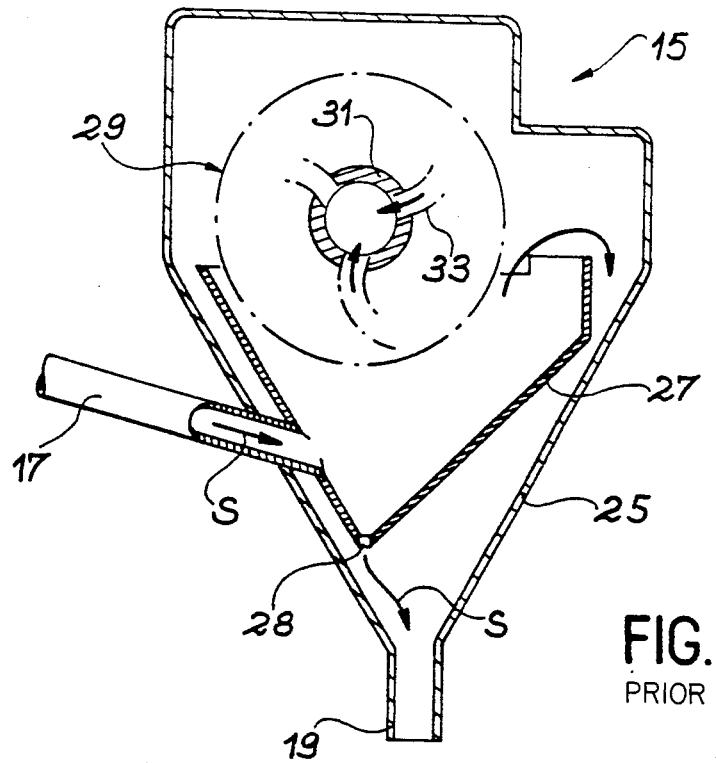
FIG. 2, already described, diagrammatically the known removal means of a transfer line.

Removal or sampling tank 41 and the wheel 49 with dosing buckets 51 are located in a reservoir 25 of the same type as shown in FIG. 2. The sampling tank 41 has a flat bottom 43 adjacent to a funnel-shaped bottom 45. The latter is provided in the vicinity of its lower end with a discharge orifice 46. The sampling or removal tank 41 has a volume which is smaller than that of the prior art removal tanks 27 (See FIG. 2).

The flat bottom 43 is inclined by a few degrees, approximately 10°, with respect to a horizontal plane. The slope of flat bottom 43 decreases towards bottom 45. Pipe 17 bringing the particle suspension from the hydraulic guard to the removal means is connected to the removal tank 41, so that the suspension arrives tangentially at flat bottom 43 at the highest level of its slope.

Wheel 49 with dosing buckets 51 preferably has a horizontal rotation axis and is positioned tangentially relative to flat bottom 43. Wheel 49 is rotated by a not shown electric motor. The dosing buckets 51 are distributed symmetrically with respect to a collector 31', to which they are connected. Thus, in the present embodiment, three dosing buckets 51 are separated from one another by an angle of 120°.

Collector 31' discharges the dosed suspension into the upper end of pipe 18, as described relative to FIG. 2 and makes it possible to discharge the particle suspension to appropriate conditioning means. Each dosing bucket 51 is formed from a single, generally metallic tube having a continuous curvature. The curvature of the bucket tubes can be obtained by bending.

As a function of the size of the suspended particles and their concentration in the suspension liquid, the dosing buckets vary as regards diameter and number. Moreover, they can be distributed in the same plane or in juxtaposed planes.

In the case of shearing fines, where the average grain size can reach 100 μm, three dosing buckets 51 distributed in the same plane are generally used and have a diameter of approximately 10 mm.

Thus, when the suspension of particles, whose displacement direction is indicated by a solid line arrow S reaches the removal tank 41 by pipe 17, with each of its buckets 51, wheel 49 removes a constant particle suspension quantity. Due to the arrangement of said wheel in tank 41, the latter removes the suspension in a high suspension turbulence zone. This zone corresponds to the arrival of the suspension at the bottom of the tank on flat bottom 43. The non-removed suspension is discharged through orifice 46 and by overflow from tank 41 and then through pipe 19, shown in FIG. 1, connecting reservoir 25 to vessel 1.

The planar shape of the bottom of tank 41, its small volume, the tangential entry of the suspension in the tank bottom, as well as the removal of the suspension in a high turbulence zone make it possible to prevent particle deposits in the removal tank. In the same way, the continuous curvature of each dosing bucket 51 makes it possible to prevent particle deposits within these buckets.

FIG. 5 diagrammatically shows another embodiment of a removal or sampling tank according to the invention making it possible to prevent deposits of particles from a particle suspension.

This removal or sampling tank 55 is located in a reservoir 25 of the same type as that shown in FIG. 2. Within this sampling tank, a wheel 49 with dosing buckets 51 removes a constant suspension quantity. This dosing bucket wheel 49 according to the invention is of the same type as shown in FIG. 4.

This sampling tank 55 has a smaller volume than the known sampling tank 27 of FIG. 2. It comprises a concave bottom 56, having a convex portion 61. The concave bottom 56 has a surface curved in first and second directions X, Z (horizontal and vertical). Bottom 56 also has a planar surface in the third direction in space Y (horizontal). Concave bottom 56 and convex portion 61 make it possible to adopt the circular shape of wheel 49 disposed tangentially to said concave bottom 56 and said convex portion 61. A discharge orifice 57 is provided in bottom 56 in accordance with the vertical axis of wheel 49 and at the formation point of convex portion 61.

The suspension supply pipe 17 is connected to tank 55, so that the suspension arrives tangentially at concave bottom 56. Convex portion 61 is located at the opposite end to the suspension arrival through pipe 17. The height of said convex portion 61 in direction Z increases from discharge orifice 57 up to the upper end of removal tank 55. The thickness of this convex portion in direction Y also increases from discharge orifice 57. On wall 65 opposite to the suspension arrival, convex portion 61 is connected to the concave bottom 56 by two rounded gutters or channels 63 on either side of convex portion 61.

Thus, when the suspension, whose displacement direction is indicated by the solid line arrow S reaches the removal or sampling tank 55 via pipe 17, the wheel 49 with dosing buckets 51 removes, and in the manner shown in FIG. 4, a constant suspension quantity. The suspension is removed directly when it arrives at the bottom of the tank in a highly turbulent zone. This turbulence is brought about by the fact that the suspension is projected onto the walls of the convex portion 61 and returns towards the center of concave bottom 56. following the shpe of channels 63.

Figure 1:
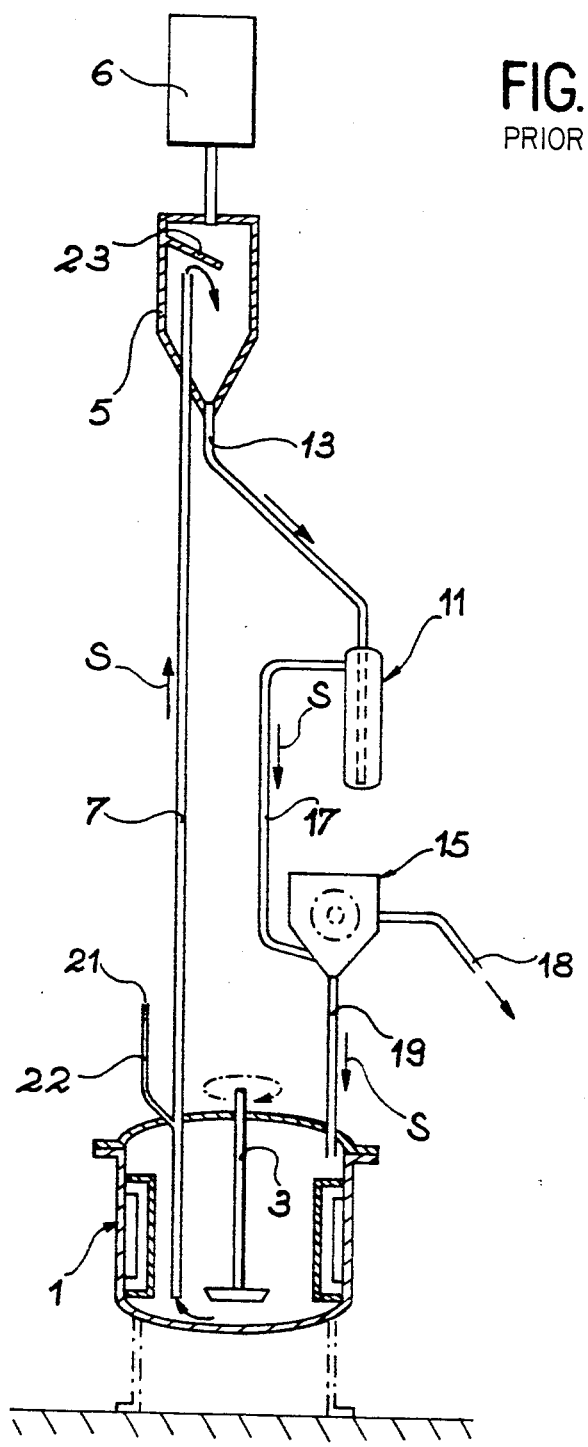
FIG. 1, already described, diagrammatically a known particle suspension transfer line.

The unremoved suspension is discharged from tank 55 by overflowing therefrom and passes through hole 57 towards tank 25 connected to vessel 1 by pipe 19 shown in FIG. 1.

The shape of the removal tank 55 and its small volume make it possible to avoid deposits of particles in the tank. The removal or sampling which takes place by means of the dosing bucket wheel at the bottom of the tank and at the arrival point of the suspension in said tank also makes it possible to prevent particle deposits. The suspension samples represent the initial quantities of suspended particles at the start of the transfer line.

Using sampling or removal tanks according to the invention, like those described in FIGS. 4 and 5, shearing fines with a grain size equal to or below 100 $\mu$m in suspension pass through these tanks at flow rates between 5 and 35 l/h without being deposited.

The embodiments of a hydraulic guard, a removal or sampling tank and a dosing bucket wheel described hereinbefore are in no way limitative. Other sampling or removal tank configurations can be realized, in order to prevent all particle deposits. Moreover, the geometrical shapes of the different components of the hydraulic guard can differ from those indicated without passing beyond the scope of the invention.

What is claimed is:

1. A transfer line for a suspension of particles in a constant quantity for the conditioning thereof and comprising a vessel for receiving the particle suspension, means for stirring said suspension in the vessel and for making it homogeneous, a separating tank above the vessel, connected to an upper end of the vessel by a first pipe and to means for forming a vacuum, the first pipe making it possible to raise the suspension of particles from the vessel to the separating tank by blowing in air, said tank making it possible to separate the blown in air and the particle suspension, a hydraulic guard below the separating tank connected thereto by a second pipe and removal means below the hydraulic guard connected thereto by a third pipe, said removal means comprising a sampling tank and a dosing bucket wheel rotating in said tank, said removal means making it possible to remove a constant particle suspension quantity with a view to the conditioning thereof and a fourth pipe connected to the removal means ensuring the discharge of the unremoved particle suspension into the vessel, the hydraulic guard incorporating means for preventing the deposition of particles from the particle suspension, the preventing means of the hydraulic guard comprising distributing blades connected to a diffuser cone arranged in a cup-shaped bottom of the hydraulic guard at a lower end of the second pipe, and a supplementary pipe making it possible to blow in air at the arrival point of the particle suspension in the hydraulic guard at a lower end of the second pipe.

2. A transfer line for a suspension of particles in a constant quantity for the conditioning thereof and comprising a vessel for receiving the particle suspension, means for stirring said suspension in the vessel and for making it homogeneous, a separating tank above the vessel, connected to an upper end of the vessel by a first pipe and means for forming a vacuum, the first pipe making it possible to raise the suspension of particles from the vessel to the separating tank by blowing in air, said tank making it possible to separate the blown in air and the particle suspension, a hydraulic guard below the separating tank connected thereto by a second pipe and removal means below the hydraulic guard connected thereto by a third pipe, said removal means comprising a removal tank and a dosing bucket wheel rotating in said tank, said removal means making it possible to remove a constant particle suspension quantity with a view to the conditioning thereof and a fourth pipe connected to the removal means ensuring the discharge of the unremoved particle suspension into the vessel, the hydraulic guard incorporating means for preventing the deposition of particles from the particle suspension, wherein the removal tank of the removal means comprises a flat bottom adjacent to a funnel-shaped bottom provided with a discharge orifice, said flat bottom sloping with respect to a horizontal plane, so that the slope of said bottom decreases towards the funnel-shaped bottom, a lower end of the third pipe being tangentially connected to the flat bottom, the dosing bucket wheel being tangential to said flat bottom.

3. A transfer line according to claim 2, wherein each bucket of the dosing bucket wheel comprises a single tube having a continuous curvature, said buckets being symmetrically distributed with respect to a collector in the center of the wheel and being located in the same plane or in parallel planes, said collector permitting the discharge of the particle suspension with a view to the conditioning thereof.

4. A transfer line for a suspension of particles in a constant quantity for the conditioning thereof and comprising a vessel for receiving the particle suspension, means for stirring said suspension in the vessel and for making it homogeneous, a separating tank above the vessel, connected to an upper end of the vessel by a first pipe and means for forming a vacuum, the first pipe making it possible to raise the suspension of particles from the vessel to the separating tank by blowing in air, said tank making it possible to separate the blown in air and the particle suspension, a hydraulic guard below the separating tank connected thereto by a second pipe and removal means below the hydraulic guard connected thereto by a third pipe, said removal means comprising a removal tank and a dosing bucket wheel rotating in said tank, said removal means making it possible to remove a constant particle suspension quantity with a view to the conditioning thereof and a fourth pipe connected to the removal means ensuring the discharge of the unremoved particle suspension into the vessel, the hydraulic guard incorporating means for preventing the deposition of particles from the particle suspension, wherein the removal tank of the removal means comprises a concave bottom with a convex portion, a lower end of the third pipe being connected tangentially to the concave bottom, the convex portion being opposite to the lower end of said third pipe so that the dosing buckets wheel is tangential to the concave bottom and to the convex portion, a discharge orifice being provided in the concave bottom at the start of the convex portion and in a vertical axis of said wheel.

5. A transfer line according to claim 4, wherein each bucket of the dosing bucket wheel comprises a single tube having a continuous curvature, said buckets being symmetrically distributed with respect to a collector in the center of the wheel and being located in the same plane or in parallel planes, said collector permitting the discharge of the particle suspension with a view to the conditioning thereof.

* * * * *